Aug. 4, 1964     J. R. GILCHRIST     3,142,855
LIQUID AND PASTE APPLICATOR
Filed May 24, 1961
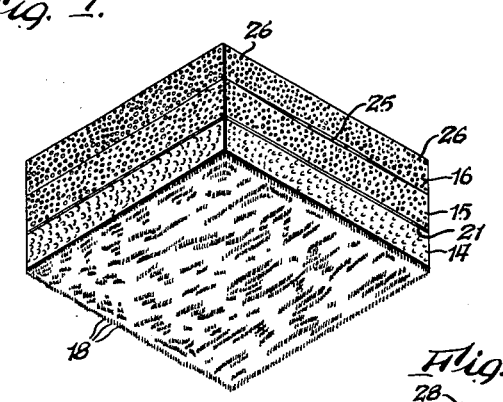
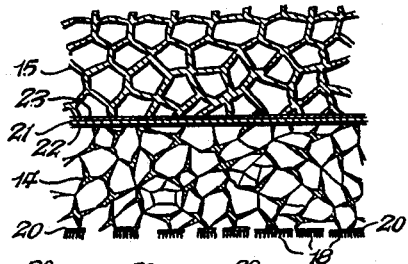
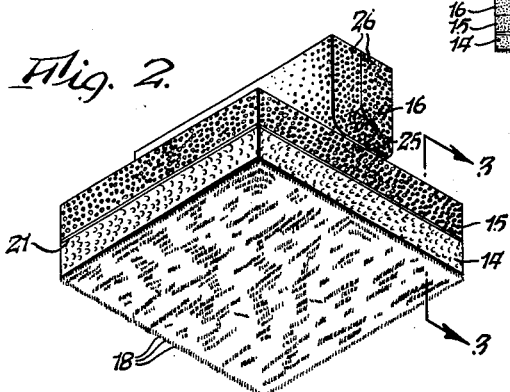
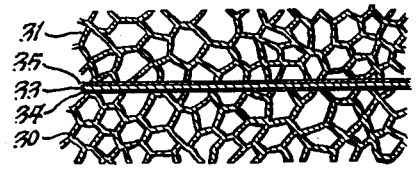
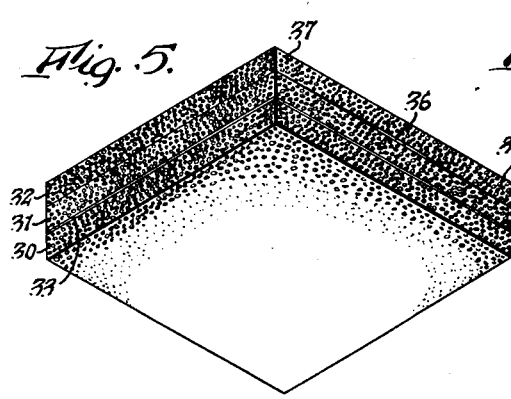
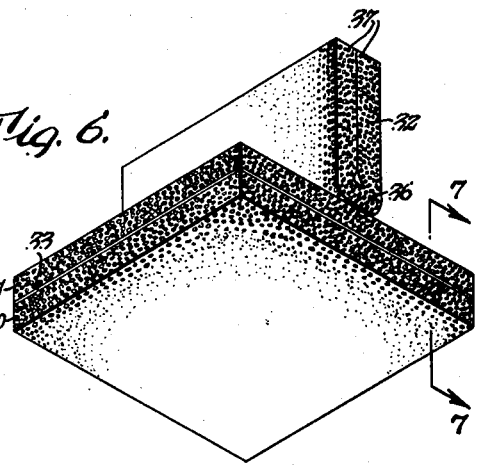
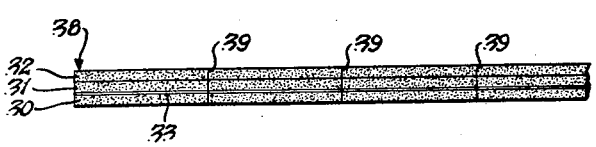
INVENTOR.
James R. Gilchrist
BY
Popp and Sommer
ATTORNEYS.

3,142,855
LIQUID AND PASTE APPLICATOR
James R. Gilchrist, Clarence, N.Y., assignor to Truly-Magic Products, Inc., Buffalo, N.Y., a corporation of New York
Filed May 24, 1961, Ser. No. 112,438
1 Claim. (Cl. 15—210)

This invention relates to applicators for liquids and paste, and more particularly to household applicators such as for white liquid shoe dressing, shoe polish in paste and liquid form, liquid floor wax, and oven cleaners in paste or liquid form and which are highly caustic.

A principal object of the invention is to provide such applicators which are of low cost so that one can be supplied with each container of the liquid or paste and thrown away when the contents of the container are used up and which will apply the proper quantity of liquid or paste, uniformly and at a constant rate, from a substantial supply of the liquid or paste contained in the applicator.

Another object is to provide such an applicator which quickly accepts a large quantity of the material to be applied and which is constructed to apply the materal as a small layer of uniform thickness and appearance with a minimum of foaming action in applying liquids.

Another object is to provide such an applicator which includes a barrier between the working part and the grip part of the applicator so as to protect the user's hands from soil or injury where highly corrosive cleaners are being applied.

Another object is to provide such an applicator which can be made of a minimum of material and of a form which will fit the container with which it is supplied.

Another object is to provide such an applicator which can be used with a minimum of streaking by members of the public having little experience in applying coatings, polishes or cleaners.

Another object is to provide applicators in such form that they are adapted to automatic packaging, more particularly in strips composed of a multiplicity of applicators from which they are readily machine-packaged with the product served.

Another object is to provide such an applicator which can be controlled to apply layers or coating of different thickness.

Other objects and advantages of the invention will be apparent from the following description and drawings in which:

FIG. 1 is a perspective view of a liquid applicator more specifically designed for applying a coating of white pigmented liquid to shoes in the form of a uniform streakless coating.

FIG. 2 is a view similar to FIG. 1 showing the grip part elevated to operative position.

FIG. 3 is an enlarged fragmentary vertical section taken on line 3—3, FIG. 2.

FIG. 4 is a diminutive side elevation of a succession of the liquid applicators shown in FIGS. 1–3 joined together to facilitate insertion into boxes automatically by the same machines which insert the bottles of liquid.

FIG. 5 is a perspective view of a paste applicator more specifically designed for applying a coating of paste shoe polish to shoes.

FIG. 6 is a view similar to FIG. 5 showing the grip part elevated to operative position.

FIG. 7 is an enlarged fragmentary vertical section taken on line 7—7, FIG. 6.

FIG. 8 is a diminutive side elevation of a succession of the paste applicators shown in FIGS. 5–7 joined together to facilitate insertion into containers by automatic packaging machines.

Referring more particularly to the liquid applicator shown in FIGS. 1–4, this applicator is more particularly designed to be included in a package or box also including a bottle of shoe whitening liquid, this liquid containing a white pigment which is left on the shoes after the liquid dries. It is important that the applicator apply a uniform layer of the liquid with a minimum of streaking; that the applicator contain a substantial quantity of liquid which can be readily metered out to produce a layer of the desired thickness or depth; that it can be worked into crevices; that the application is made with a minimum of foaming; and that it can be used without soiling one's fingers.

To this end the liquid applicator is composed of three layers 14, 15 and 16 of polyurethane foam or sponge. These layers are shown as being rectangular and of the same size in plan and in register, to jointly provide a block, it being a feature of the invention that they can be shipped to the manufacturer of the liquid in the form of a strip of connected applicators which permits them to be inserted into the packages for the liquid by standard packaging machinery. The layer 14 constitutes the working layer of the applicator and this layer is made of open cell polyurethane foam, this being commercially available and being made in such manner as to rupture the walls of the sponge cells so that these cells are interconnected to receive and hold a large quantity of liquid.

An important feature of the form of the invention shown in FIGS. 1–4 resides in the provision of flock adherent to the working face of the working layer of polyurethane foam. This flock is preferably in the form of short, rayon fibers 18 which are adhesively united to the working face of the applicator in such small amount as not to blind its openings but in sufficient amount to smooth out the liquid as it is applied and reduce its foaming action. To this end the flock is applied by first subjecting the working face of the working layer 14 to a very fine mist of a polyester base adhesive, illustrated at 20, to provide a very thin coating on the edges of the craters of the surface cells which form the working face, following which the flock 18 is blown against the working face, those fibers adhering which actually contact the adhesive.

The layer 15 is preferably of the closed cell type of polyurethane foam or sponge to have greater rigidity and this rigidity is further increased and the applicator rendered operative as a flexible tool by a flexible polyester film 21, such as that marketed under the trademark Mylar, adhesively sandwiched between the layers 14 and 15. This film is in the order of .0035 inch thickness and is adhered by films 22 and 23 of polyester base adhesive to the opposing faces of the polyurethane foam layers 14 and 15, respectively. This polyester film serves to stiffen the applicator in the direction of its working face and also to hold the applicator flexibly or yieldingly in shape transversely of the working face so that its edges and corners can be worked into corners or crevices. In this function the polyester film 21 also acts as flexible planar backbone to permit varying the pressure of application in moving exactly the amount of liquid from the body of the open cell foam layer 14 onto the surface being worked on to produce a uniform layer of the required depth free from streaks.

This polyester film also acts as a barrier to the passage of the working liquid to the second and third layers 15, 16, the latter serving as a grip, handle or fingerpiece. To this end this third layer 16, which can be of the closed cell type of polyurethane form for greater stiffness, is united to the back face of the layer 15 by a single stripe 25 of adhesive which extends centrally between the layers 15, 16 from one pair of their edges to the opposite pair of their edges and is spaced from the other edges thereof. This stripe of adhesive unites the polyurethane foam layers 15, 16 but permits the sides 26 of the layer 16 to be lifted up and brought together in face-to-face relation as illustrated in FIG. 2, thereby to serve as a fingerpiece or handle by which the applicator can be conveniently manipulated. The polyester film 21 protects this fingerpiece, and the user's fingers, from soil.

As previously indicated, to adapt the invention to standard packaging machinery wherein the bottle of liquid and the applicator are packaged automatically at the same time, the applicators are supplied to the manufacturer of the liquid in strips 28 of a connected series of applicators, the connection being by a thin hinge 29 of material left uncut from the ends 26 of the handle forming layer 16 near one face thereof, as illustrated in FIG. 4. By these hinge connections 29 the strips 28 of applicators can be fed to the packaging machine along with the procession of bottles and packaging materials and all automatically brought into assembled relation.

In use the package is opened and the bottle of white shoe liquid and the applicator removed therefrom and the bottle opened. The liquid from the bottle or other container is then soaked up into the open cell polyurethane sponge layer 14 by dipping it into the liquid or pouring the liquid over it, the handle ends 26 being bent back together as shown in FIG. 2 for this operation. Travel of the liquid through to the layer 15 and fingerpiece 16 is barred by the barrier polyester film 21.

The working or flock covered surface of the working layer 14 is then drawn over the shoes, and in doing so the proper pressure, soon acquired, is applied through the fingerpiece ends 26, to move the amount of liquid from the open cell polyurethane working layer 14 onto the surface being worked to provide the thickness of layer desired. In doing so, the flock 18 is effective both in smoothing out the surface of the layer being applied and in inhibiting foaming of the liquid.

In so spreading the liquid on the surface being worked, the polyester film 21 acts as a planar stiffening backbone to permit the entire working surface to be effectively used. At the same time it is sufficiently flexible to follow the rounding surfaces of shoes without difficulty. Also it reinforces the edges and corners against pressure in the direction of the working face so that the edges of the applicator can be worked into the crevices between the soles and uppers of the shoes to apply liquid therein and so that the corners can be used to apply liquid into still more inaccessible places.

Referring more particularly to the paste applicator shown in FIGS. 5–8, this applicator is more particularly designed to be included in or with a can of shoe paste. It is important that the applicator accept a limited but substantially quantity of the paste; that it apply a uniform layer with a minimum of streaking; that the paste can be worked into holes and crevices; that the layer can be applied in the desired thickness or depth; and that it can be used without soiling one's fingers.

To this end the paste applicator is composed of three layers 30, 31 and 32 of closed cell polyurethane foam or sponge. These layers are shown as being rectangular and of the same size in plan and in register, to jointly provide a block. The layer 30 is made of closed cell polyurethane foam, this being made in such manner as to leave most of the walls of the cells intact so that the cells are disconnected and hence only the cells at the surface are effective to hold or store a quantity of paste.

As with the form of the invention shown in FIGS. 1–4, the layers 31 and 32 are preferably of the closed cell type of polyurethane foam or sponge and the rigidity of the applicator in the direction of its working face is increased and the applicator rendered operative as a flexible tool by means of a flexible polyester film 33, such as that marketed under the trademark Mylar, adhesively sandwiched between the layers 30 and 31. This manually flexible film is in the order of .0035 inch thickness and is adhered by films 34 and 35 of polyester base adhesive to the opposing faces of the polyurethane foam layers 30 and 31, respectively. This polyester film serves to stiffen the applicator in the direction of its working face, and also to hold the applicator flexibly or yieldingly in shape transversely of the working face so that its edges and corners can be worked into corners and crevices. In this function the polyester film 33 also acts as a flexible planar backbone to permit varying the pressure of application in moving the amount of paste from the working face of the layer 30 onto the surface being polished to produce a uniform layer of the required depth free from streaks.

This polyester film 33 also acts as a barrier to the passage of the paste to the second and third layers 31, 32, the latter serving as a grip, handle or fingerpiece. To this end this third layer 32, which can be of the closed cell type of polyurethane, is united to the back face of the layer 31 by a single stripe 36 of adhesive which extends centrally between the layers 31 and 32 from one pair of their edges to the other pair of their edges and is spaced from the remaining edges thereof. This stripe of adhesive unites the polyurethane foam layers 31, 32 but permits the sides 37 of the layer 32 to be lifted up and brought together in face-to-face relation as illustrated in FIG. 6, thereby to serve as a fingerpiece or handle by which the applicator can be conveniently manipulated. The polyester film 33 protects this fingerpiece, and the user's fingers, from soil.

As with the form of the invention shown in FIGS. 1–4, the invention is adapted to standard packaging machinery wherein the applicator is automatically placed with its working face in contact with the paste in the can before the cover is placed upon the can to seal the paste and applicator in the can. To this end the applicators are supplied to the paste manufacturer in strips 38 of a connected series or chain of applicators, the connections being by thin hinges 39 of polyurethane sponge material left uncut from the ends 37 of the handle forming layer 32, as illustrated in FIG. 8. By these hinge connections the strips 38 of applicators can be fed to the packaging machine along with the procession of cans and covers and paste and all automatically brought to assembled relation.

When the user opens the lid of the paste can the applicator is on top of the paste and the user lifts the handle portions 37 and spreads the face of the working layer 30 around the surface of the paste to work an adequate quantity of the paste into the surface pores of this working layer. This paste covered surface is then drawn over the shoes and in doing so the proper pressure, soon acquired, is applied through the fingerpiece ends 37, to move the amount of paste from the cratered surface of the working layer 30 onto the surface being polished to provide the thickness of coating desired.

In so spreading the paste on the surface being worked, the polyester film 33 acts as a planar stiffening backbone to permit the entire working surface to be effectively used. At the same time it is sufficiently flexible to follow the rounding surfaces of the shoes without difficulty. Also it reinforces the edges and corners against pressure in the direction of the working face so that the edges of the applicator can be worked into the crevices between the soles and uppers of the shoes to apply paste therein and so that the corners can be used to apply paste into still more inaccessible places.

From the foregoing it will be seen that the different forms of the present disclosure provide simple and serviceable applicators accomplishing the different objects set forth.

I claim:

An applicator, comprising (A) a generally flat working member polyurethane sponge pad of the open cell type in which the walls between cells are ruptured to
  (a) have body softness,
  (b) to provide a broad working face capable of adapting itself to the surface to be coated and (c) to establish communication between its cells and with the surface cells forming craters so that a substantial quantity of liquid can be absorbed into said working member pad to be released through the craters of its broad working face in response to working force applied through said working member pad against said surface to be coated, (B) a backing member polyurethane sponge pad of the closed cell type in which the cells are substantially isolated from one another
 (a) to have the required body firmness to transmit said working forces to said working member pad, (C) a flexible polyester film in the order of .0035 of an inch thickness generally coextensive with and interposed between opposed broad faces of said pads and secured thereto,
 (a) to stiffen the applicator in the direction of said broad working face,
 (b) to hold the applicator yieldingly in shape transversely of the said working face to permit the working member pad to be worked into corners and crevices, and
 (c) to permit of varying the working forces applied from said backing member pad to said working member pad to move the desired amount of liquid contained in said working member pad onto said surface, (D) a generally flat handle member polyurethane sponge pad generally coextensive with and arranged against the broad face of said backing member pad remote from said working face, (E) a narrow stripe of adhesive uniting central portions only of said backing member pad to said handle member pad and extending substantially from one edge of the applicator to the opposite edge, thereof,
 (a) whereby edge portions of said handle member pad can be moved from said backing member pad and brought into face-to-face relation with each other to form a handle, and (F) small fibers and an adhesive uniting said small fibers with the rims only of said craters of said working face
 (a) to assist in the streakless release of said liquid.

References Cited in the file of this patent

UNITED STATES PATENTS

| | | |
|---|---|---|
| 1,778,270 | Miller | Oct. 14, 1930 |
| 2,187,140 | Faris et al. | Jan. 16, 1940 |
| 2,912,711 | Hilton | Nov. 17, 1959 |
| 2,961,677 | Zecchini | Nov. 29, 1960 |
| 2,962,743 | Henricksson | Dec. 6, 1960 |
| 2,962,746 | Heroy et al. | Dec. 6, 1960 |
| 3,014,795 | Schmidlin | Dec. 26, 1961 |

FOREIGN PATENTS

| | | |
|---|---|---|
| 810,095 | Great Britain | Mar. 11, 1959 |
| 1,029,136 | Germany | Apr. 30, 1958 |
| 1,229,213 | France | Mar. 21, 1960 |